(12) United States Patent
Nguyen et al.

(10) Patent No.: US 9,080,743 B2
(45) Date of Patent: Jul. 14, 2015

(54) LENS, LED BACKLIGHT MODULE AND DISPLAY DEVICE

(71) Applicant: SHENZHEN COOCAA NETWORK TECHNOLOGY CO., LTD, Shenzhen (CN)

(72) Inventors: The Tran Nguyen, Shenzhen (CN); Sikuan Shen, Shenzhen (CN)

(73) Assignee: SHENZHEN COOCAA NETWORK TECHNOLOGY CO., LTD, Shenzhen (CN)

( * ) Notice: Subject to any disclaimer, the term of this patent is extended or adjusted under 35 U.S.C. 154(b) by 18 days.

(21) Appl. No.: 13/991,064

(22) PCT Filed: Jan. 21, 2013

(86) PCT No.: PCT/CN2013/070792
§ 371 (c)(1),
(2) Date: May 31, 2013

(87) PCT Pub. No.: WO2014/110832
PCT Pub. Date: Jul. 24, 2014

(65) Prior Publication Data
US 2014/0204563 A1  Jul. 24, 2014

(51) Int. Cl.
*G09F 13/04* (2006.01)
*F21V 5/04* (2006.01)
(Continued)

(52) U.S. Cl.
CPC ... *F21V 5/04* (2013.01); *F21K 9/50* (2013.01); *G02B 19/0028* (2013.01); *G02B 19/0061* (2013.01); *G02B 19/0071* (2013.01)

(58) Field of Classification Search
CPC .......... F21V 5/04; F21K 9/50; G02B 19/0071
USPC ................................. 362/97.1, 335
See application file for complete search history.

(56) References Cited

U.S. PATENT DOCUMENTS 7,182,481 B2 * 2/2007 Shimura .................. 362/244
7,452,093 B2 * 11/2008 Nagao ..................... 362/97.1
8,076,691 B2 * 12/2011 Park ............................ 257/98
(Continued)

FOREIGN PATENT DOCUMENTS

CN          1249818       4/2000
CN          101363588     2/2009
(Continued)

*Primary Examiner* — Britt D Hanley
*Assistant Examiner* — Matthew J Peerce
(74) *Attorney, Agent, or Firm* — Hamre, Schumann, Mueller & Larson, P.C.

(57) ABSTRACT

This invention is suitable for optical technology field. A lens, LED back light module and display device are provided. The lens receives light emitted by the light source through a light incident surface, the light emitted by the light source enters in the lens, a part of the light is refracted from one light exiting surface, a part of the light is reflected from one light exiting surface to another light exiting surface or bottom surface, then is reflected from the another light exiting surface or bottom surface to further another light exiting surface and finally is refracted from the further another light exiting surface, therefore the light emitted by the light source is separated in the lens, and then each light is refracted from different light exiting surface of the lens thereby increasing the light exiting area and the uniformity. The lens of the present invention is suitable for the LED back light modules and display devices.

10 Claims, 3 Drawing Sheets

(51) Int. Cl.
*F21K 99/00* (2010.01)
*G02B 19/00* (2006.01)

(56) References Cited

U.S. PATENT DOCUMENTS

| 8,246,197 | B2* | 8/2012 | Huang | 362/235 |
| 2004/0114348 | A1* | 6/2004 | Lin | 362/31 |
| 2008/0142822 | A1* | 6/2008 | Kim et al. | 257/98 |
| 2011/0304764 | A1 | 12/2011 | Shigemitsu et al. | |
| 2012/0075866 | A1* | 3/2012 | Chang | 362/296.01 |

FOREIGN PATENT DOCUMENTS

| JP | 3955189 | 8/2007 |
| JP | 4348917 | 10/2009 |

* cited by examiner

LENS, LED BACKLIGHT MODULE AND DISPLAY DEVICE

TECHNICAL FIELD

The present invention relates to an optical field, and more particularly, to a lens, led backlight module and display device.

BACKGROUND

The light emitting diode (LED) emits lights in a single direction, the distribution range of light intensity is narrow, so the LED needs a lens to distribute the light. However the lights emitted from the LED is with small area and is not uniform enough after emitted from the present lens to be unable to satisfy the requirement of the application. Therefore many LEDs are used to be arranged to achieve that different points have the same and uniform light intensity in a same plane. It will lead to high cost and a heavy back light module system.

SUMMARY

The invention aims at providing a lens to solve the problem that the lights emitted from the LED is with small area and is not uniform enough after emitted from the present lens.

The embodiment of the present invention provides a lens comprising:
- a bottom surface;
- a light incident surface configured to receive light emitted by the light source;
- a first convex curved surface used as a first light exiting surface;
- a first ringy inclined plane used as a second light exiting surface;
- a second convex curved surface used as a third light exiting surface,
- wherein the first light exiting surface, the second light exiting surface and the third light exiting surface are successively connected from top to bottom and from inside to outside; the second light exiting surface contacts with the third light exiting surface to form a first step, the light incident surface is an inner concave cambered surface, tangent lines of the generatrixes of the inner concave cambered surface intersect a rotation axis therein to form first included angles; the first light exiting surface is a convex curved surface with a central recess, tangent lines of the generatrixes of the convex curved surface with central recess intersect a rotation axis therein to form second included angles; the second light exiting surface intersects the bottom surface to form a third included angle; the third light exiting surface is an outer convex curved surface, tangent lines of the generatrixes of the outer convex curved surface intersect a rotation axis therein to form fourth included angles.

The embodiment of the present invention further aims at providing a LED back light module, comprising a plurality of LEDs, wherein the LED back light module comprises the lens of any of claims 1-8, each LED matches with the lens.

The embodiment of the present invention further aims at providing a display device, wherein the display device comprises the above mentioned lens.

In the embodiment of the present invention, the light incident surface receives the light emitted by the light source. When the light emitted by the light source enters in the lens, a part of the light is refracted from one light exiting surface, a part of the light is reflected from one light exiting surface to another light exiting surface or bottom surface, then is reflected from the another light exiting surface or bottom surface to further another light exiting surface and finally is refracted from the further another light exiting surface.

Therefore the light emitted by the light source is separated in the lens, and then each light is refracted from different light exiting surface of the lens thereby increasing the light exiting area and the uniformity. The lens of the present invention is suitable for the LED back light modules and display devices.

DETAILED DESCRIPTION OF THE PREFERRED EMBODIMENTS

Figure 1:
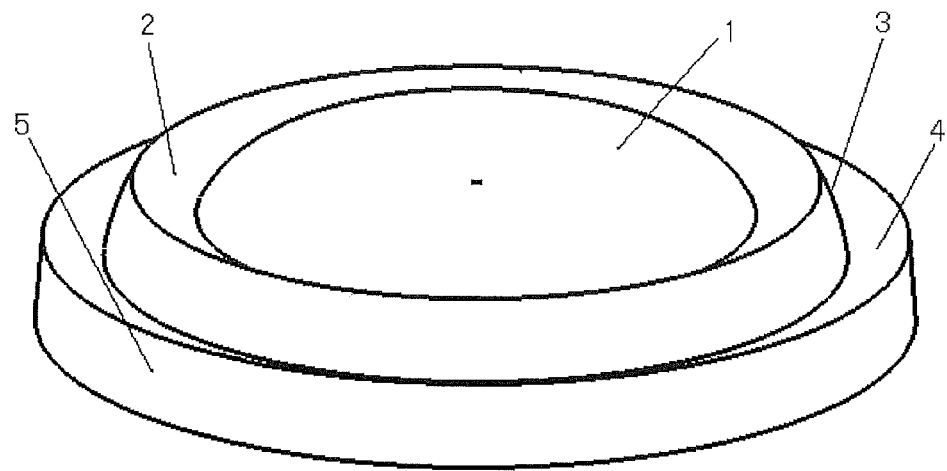
FIG. 1 is a perspective view according to an embodiment of the present invention.
Figure 2:
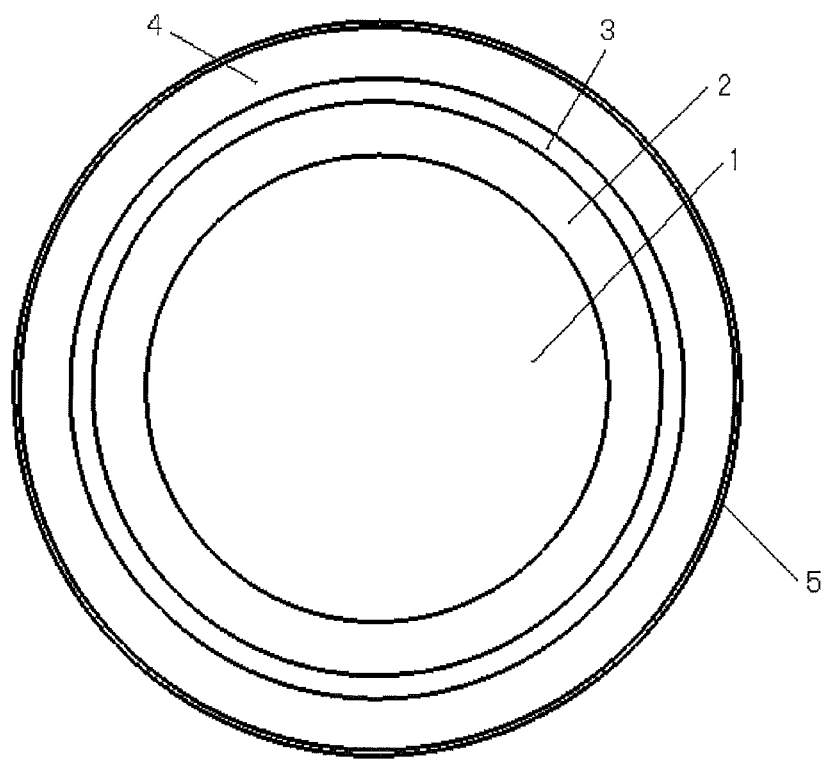
FIG. 2 is a top view according to the embodiment of the present invention.
Figure 3:
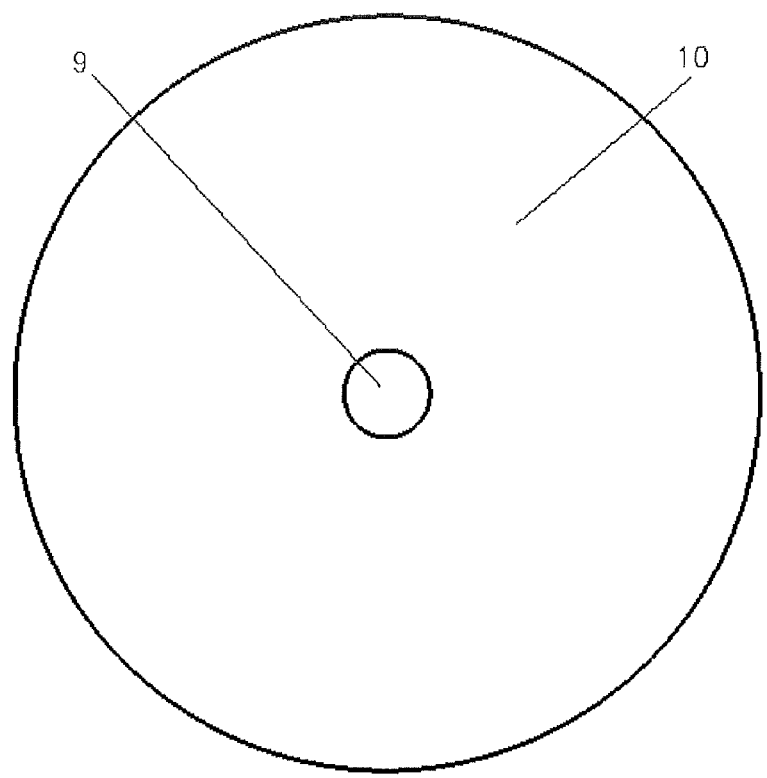
FIG. 3 is a bottom view according to the embodiment of the present invention.
Figure 4:
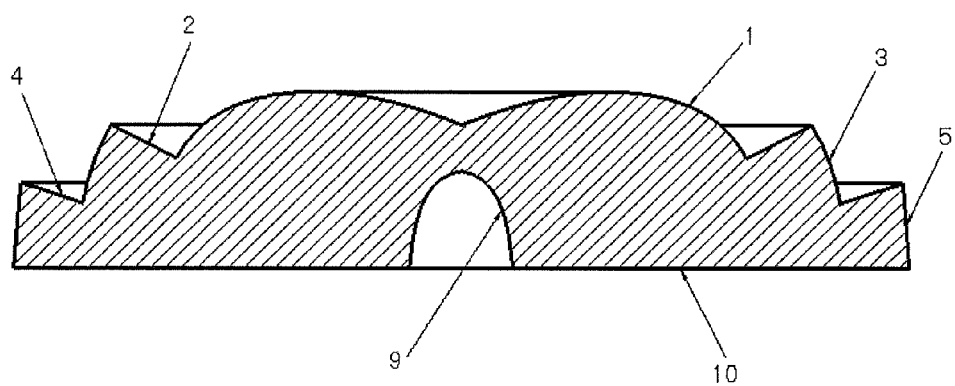
FIG. 4 is a cross-section view according to the embodiment of the present invention (the lines are the generatrixes of the corresponding surfaces)
Figure 5:
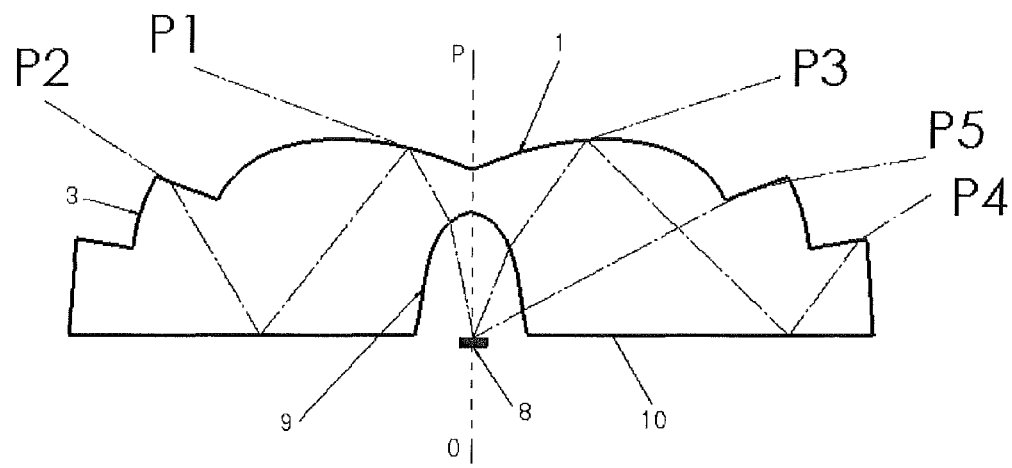
FIG. 5 is an optical path view of light in the lens with two steps according to the embodiment of the present invention.

To make the objectives, technical solutions and advantages of the present invention clearer, the present invention will be further described hereafter with reference to the accompany drawings and embodiments. However, it shall be understood that, the embodiments described herein are only intended to illustrate but not to limit the present invention.

In the embodiments of the present invention, the light incident surface receives the light emitted by the light source. When the light emitted by the light source enters in the lens, a part of the light is refracted from one light exiting surface, a part of the light is reflected from one light exiting surface to another light exiting surface or bottom surface, then is reflected from the another light exiting surface or bottom surface to further another light exiting surface and finally is refracted from the further another light exiting surface. Therefore the light emitted by the light source is separated in the lens, and then each light is refracted from different light exiting surface of the lens thereby increasing the light exiting area and the uniformity.

The present invention will be described in detail by using the LED as the light source.

As shown in FIGS. 1-5, the embodiment of the present invention provides a lens includes a bottom surface 10; a light incident surface 9 configured to receive light emitted by a light source 8; a first convex curved surface used as a first light exiting surface 1; a first ringy inclined plane used as a second light exiting surface 2; a second convex curved surface used as a third light exiting surface 3, wherein the first light exiting surface 1, the second light exiting surface 2 and the third light exiting surface 3 are successively connected from top to bottom and from inside to outside; the second light exiting surface 2 contacts with the third light exiting surface 3 to form a first step, the light incident surface 9 is an inner concave cambered surface, tangent lines of the generatrixes of the inner concave cambered surface intersect a rotation axis OP therein to form first included angles; the first light exiting surface 1 is a convex curved surface with a central recess, tangent lines of the generatrixes of the convex curved surface intersect a rotation axis OP therein to form second included angles; the second light exiting surface 2 intersects the bottom surface 10 to form a third included angle; the third light exiting surface 3 is an outer convex curved surface, tangent lines of the generatrixes of the outer convex curved surface intersect a rotation axis OP therein to form fourth included angles. The light incident surface 9 receives the light emitted by the LED. When the light emitted by the LED light source 8 enters in the lens, a part of the light is refracted from one light exiting surface, a part of the light (such as light P1, P3) is reflected from one light exiting surface to another light exiting surface or bottom surface, then is reflected from the another light exiting surface (such as light P5) or bottom surface (such as light P2, P4) to further another light exiting surface and finally is refracted from the further another light exiting surface. Therefore the light emitted by the LED light source 8 is separated in the lens, and then each light is refracted from different light exiting surface of the lens thereby increasing the light exiting area and the uniformity.

Usually, the values of the first included angles (that is angles between tangent lines of the generatrixes of the convex curved surface with the central recess and the rotation axis therein) decrease from top to bottom. In detail, the decreasing extent is determined by the uniformity and the directivity of the LED light source, that is the design of the angles between tangent lines of the generatrixes of the inner concave cambered surface and the rotation axis therein should consider the angle of the light exiting surface of the below LED light source, the height of the light exiting surface of the below LED light source and other parameters. Generally, the larger is the angle of the light exiting surface of the LED light source or the better is the uniformity of the LED light source, the smaller is the angle between tangent line of the generatrixe of the inner concave cambered surface and the rotation axis therein.

In some embodiment of the present invention, the values of the second included angles (that is angles between tangent lines of the generatrixes of the convex curved surface with the central recess and the rotation axis therein) increase and then decrease from inside to outside. In detail, the first convex curved surface 1 is with a central recess. The central of the recess is a singular point (equal to a mutation point), the angles between tangent lines of the generatrixes of the convex curved surface with the central recess and the rotation axis OP therein increase sharply from 90° in the center point and then decrease along the outward direction. The increasing extent and the decreasing extent are relative to the uniformity and the expanded size of the light source.

The angle between the second light exiting surface 2 and the bottom surface 10 is less than 45° thereby making the incident light be refracted more easily, therefore the incident light is more dispersed and is deflected from the rotation axis so as to separate the reflected light. So a focused light leading a central light point may be avoid, and the purpose of homogenizing the light is achieved. Besides, the values of the fourth included angles (that is the angles between tangent lines of the generatrixes of the third light exiting surface and the rotation axis therein) increase from top to bottom to expand the lights evenly. The best angle of the fourth included angles is determined by the value or the angle of the light exiting surface.

In some embodiment of the present invention, the lens further includes a second ringy inclined plane used as a fourth light exiting surface 4 and a third convex curved surface or a circular table surface used as a fifth light exiting surface 5. The fourth light exiting surface 4 contacts with the third light exiting surface 3, the fourth emergent surface 4 contacts with the fifth light exiting surface 5 to form a second step; the angle between the fourth light exiting surface 4 and the bottom surface 10 is less than the angle between the second light exiting surface 2 and the bottom surface 10. When the fifth light exiting surface 5 is an outer convex curved surface, the values of the angles between tangent lines of the generatrixes of the outer convex curved surface and the rotation axis therein increase from top to bottom. In this embodiment, the fifth light exiting 5 may be also a circular table surface which is beneficial for the molding of the lens.

Figure 6:
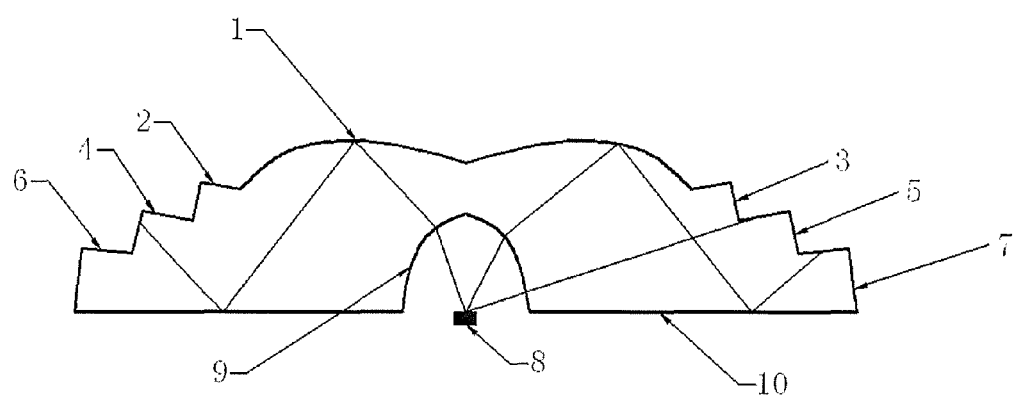
FIG. 6 is a structure schematic view of the lens with three steps according to the embodiment of the present invention.

Referring to FIG. 6, for a larger area and a better uniformity of the lights emitted by the light source 8 and then exiting from the lens, the side surface of the lens is provided with a third step formed by the contact of a third ringy inclined plane and a fourth convex curved surface. The third ringy inclined plane is used as a sixth light exiting surface 6; the fourth convex curved surface is used as a seventh light exiting surface 7. The sixth light exiting surface 6 contacts with the fifth light, exiting surface 5. The angle between the sixth light exiting surface 6 and the bottom surface 10 is less than the angle between the fourth light exiting surface 4 and the bottom surface 10. When the seventh light exiting surface 7 is an outer convex curved surface, the values of the angles between tangent lines of the generatrixes of the outer convex curved surface and the rotation axis therein increase from top to bottom. Therefore the lights in the lens are more dispersed, the light exiting area and the uniformity of the exiting lights increases. In this embodiment, the fifth light exiting 7 may be also a circular table surface which is beneficial for the molding of the lens.

In the embodiments of the present invention, the bottom surface 10 is a plane with three dimension structure; the plane with three dimension structure is a pyramid, cone, partial sphere, cylinder or prism circle/groove thereby further enhancing the dispersed effect of the lights in the lens and increasing the uniformity of the exiting lights. If the light source is the LED, a plurality of LEDs and the lens matched with each LED may be manufactured as a LED back light module.

The lens may be made of the transparent material such as glass, ceramic or polymer material, for example polytetrafluoroethylene (PTFE), methyl methacrylate (PMMA), PEMA, polycarbonate, silicone and other polymer mixture. The manufacturing process of the lens may be injection molding or compression molding, which is beneficial for the molding of the lens. The light incident surface 9 is an inner concave surface, and the symmetry axis of the light incident surface 9 is the optical axis of the lens.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A lens, comprising:
   a lens body having a central axis, and a top and a bottom opposite to each other;
   a bottom surface located at the bottom of the lens, the bottom surface having an outer periphery;
   a light incident surface defined in the bottom surface and extending away from the bottom surface toward the top of the lens body, and a light exiting surface, comprising:
a convex curved surface located at the top of the lens body, the convex curved surface extending from the central axis upwardly and radially outwardly, forming a central recess, and continuously extending radially outwardly to a first peripheral edge; and
a first step having an upper surface extending from the first peripheral edge upwardly and radially outwardly to a first step edge, and a side surface extending downwardly and radially outwardly from the first step edge to a second peripheral edge, the upper surface of the first step being configured to face at least partially toward the central axis,
wherein the light exiting surface extends from the central recess to the upmost portion of the convex curved surface and descends generally toward the bottom surface when the light exiting surface extending from the central axis toward the outer periphery of the bottom surface,
wherein an upmost portion of the first step is located lower than the upmost portion of the convex curved surface, and
wherein
tangent lines of a generatrix of the light incident surface intersects the central axis, thereby forming first included angles,
tangent lines of a generatrix of the convex curved surface intersects the central axis, thereby forming second included angles,
a tangent line of the upper surface of the first step intersects the bottom surface, thereby forming a third included angle, and
tangent lines of a generatrix of the side surface of the first step intersects the central axis, thereby forming fourth included angles.

2. The lens of claim 1, wherein the values of the first included angles decrease from the central axis toward a periphery of the light incident surface.

3. The lens of claim 1, wherein the values of the second included angles increase and then decrease from the central axis toward the first peripheral edge.

4. The lens of claim 1, wherein the third included angle is less than 45°.

5. The lens of claim 1, wherein the values of the fourth included angles increase from the first step edge toward the second peripheral edge.

6. The lens of claim 1, further comprising:
a second step having an upper surface extending from the second peripheral edge upwardly and radially outwardly to a second step edge, and a side surface extending downwardly from the second step edge to a third peripheral edge, the upper surface of the second step being configured to face at least partially toward the central axis,
wherein
a tangent line of the upper surface of the second step intersects the bottom surface, thereby forming a fifth included angle, and
tangent lines of a generatrix of the side surface of the second step intersect the central axis, thereby forming sixth included angles,
wherein the fifth included angle is smaller than the third included angle, and
wherein the sixth included angles increase from the second step edge to the third peripheral edge.

7. The lens of claim 6, further comprising:
a third step having an upper surface extending from the third peripheral edge upwardly and radially outwardly to a third step edge, and a side surface extending downwardly from the third step edge to a fourth peripheral edge, the upper surface of the third step being configured to face at least partially toward the central axis,
wherein
a tangent line of the upper surface of the third step intersects the bottom surface, thereby forming a seventh included angle, and
tangent lines of a generatrix of the side surface of the third step intersect the central axis, thereby forming eighth included angles,
wherein the seventh included angle is is smaller than the fifth included angle, and
wherein the eight included angles increase from the third step edge to the fourth peripheral edge.

8. The lens of claim 1, wherein the bottom surface is a plane, the plane is a cross section of a pyramid, cone, partial sphere, cylinder or prism circle/groove.

9. A LED back light module, comprising a plurality of LEDs, wherein the LED back light module comprises the lens of claim 1, each LED matches with the lens.

10. A display device, wherein the display device comprises the lens of claim 1.

* * * * *